UNITED STATES PATENT OFFICE 2,511,475

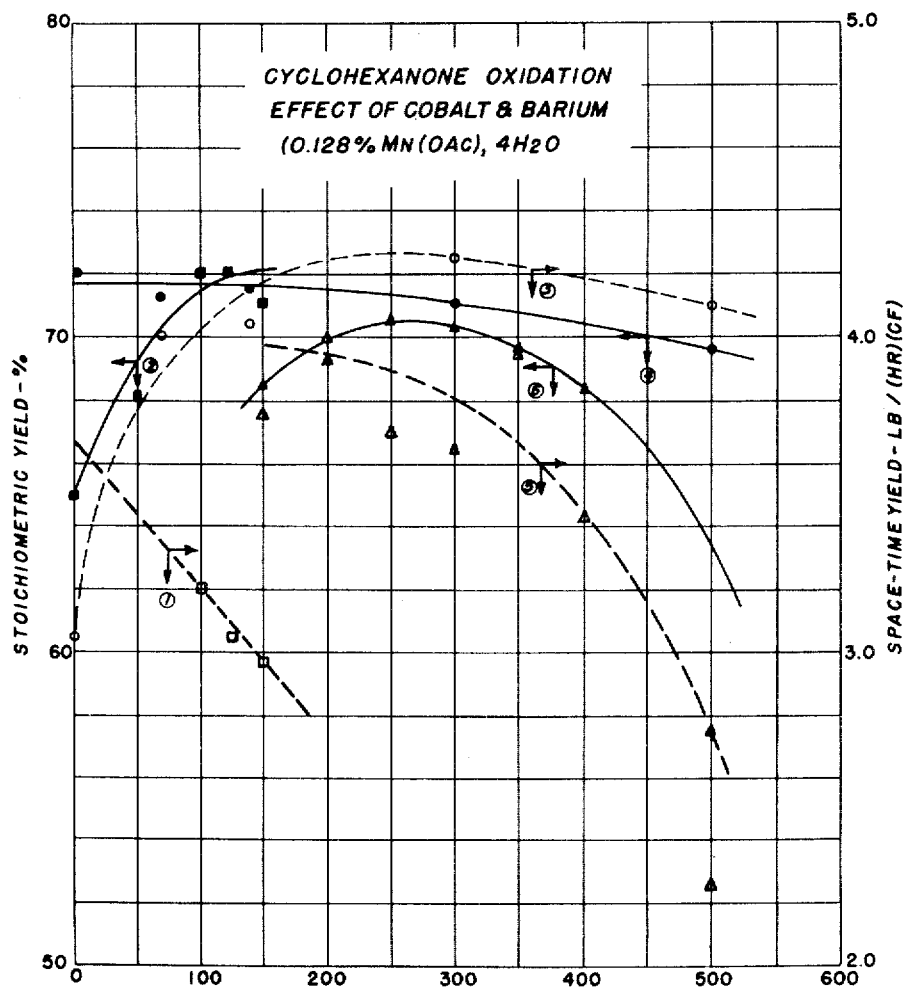

CATALYTIC OXIDATION OF KETONES

Donald D. Lee, Charleston, and Charles Sparacino, Belle, W. Va., assignors to E. I. du Pont de Nemours & Company, Wilmington, Del., a corporation of Delaware Application April 29, 1947, Serial No. 744,750

7 Claims. (Cl. 260—537)

This invention relates to catalytic oxidation and more particularly to an improved process for the catalytic oxidation of ketones.

Processes have previously been proposed for the oxidation of ketones, such, for example, as described in U. S. Letters Patent 2,005,183 to W. Flemming et al. and 2,316,543 to W. J. Amend. In these patents it is shown that various ketones may be catalytically oxidized to acids by oxidation of the ketones corresponding to the general formula: RCOR' in which R denotes an alkyl, cycloalkyl, aralkyl or aryl radical and R', an alkyl cycloalkyl or aralkyl radical or in which R and R' are connected with each other as members of a non-aromatic ring system, the ketones of this general character being subjected to oxidation in the liquid phase by means of an oxygen-containing gas such as, oxygen, air or oxygen-enriched air. In the processes previously described such as, for example, those of the Flemming et al. patent, a large number of catalysts for the reaction are disclosed while in the Amend patent metallo organic catalysts are claimed.

It is an object of the present invention to provide a process for the controlled oxidation of ketones, in which improved catalysts are used. Another object is to provide an improved process for the production of adipic acid from cyclohexanone. Yet another object is to provide a mixed catalyst of manganese and barium acetate containing a prescribed amount of cobalt acetate. Other objects and advantages of the invention will hereinafter appear.

In accord with this invention important improvements in the production of acids from the corresponding ketones over the prior art may be obtained in the oxidation of ketones by employing a mixture of manganese salt, such as acetate, propionate, isobutyrate, chloride, nitrate or the like, and a similar salt of barium, strontium, calcium and magnesium, there being present in this mixture a small proportion of a similar salt of cobalt, the acetate being preferred.

When using for the catalytic oxidation of cyclohexanone, a particular mixture of manganese and barium acetate made from crude manganese and barium acetate purchased from a new supplier, the amount of acid produced was far below rated production. Upon exacting analysis of the catalysts the surprising discovery was made that the new material was purer than that previously used and an investigation was instituted to determine what impurity was responsible for the superior rates of production of the old catalyst over the new. This investigation resulted in the finding that the new catalyst contained very small amounts of cobalt as an impurity while the old contained much larger amounts. Further study revealed that a certain prescribed ratio of cobalt to manganese was necessary to produce optimum rates of converting cyclohexanone to adipic acid. The optimum concentration was found to be between about 70 and 300 parts of cobalt as metal per million parts of manganese acetate with a preferred concentration between 130 to 180 parts per million on the same basis. Generally from 0.01 to 0.2% of manganese acetate, based on the weight of the solvent, may be used, although preferably from 0.5 to 0.15 is employed. By adding the above amounts of cobalt acetate to the newly prepared catalyst, production rates equal to those obtained with the old were realized. Furthermore, electrolytic metals containing as received, no analytically detactable quantity of cobalt, when made into manganese acetate—barium acetate catalysts of mediocre activity, were converted to superior catalysts by the addition of the aforesaid amounts of cobalt acetate.

Thus, according to the present invention it has been found that a barium acetate-manganese acetate catalyst, free from cobalt acetate, gives as much as a 40% reduction in adipic acid production capacity over an identical catalyst containing the aforesaid amounts of cobalt acetate.

We have further found that the ratio of alkaline earth metal to manganese acetate used in this oxidation process may vary over a fairly wide range such as from 0.5 to 1 to as high as 3.0 to 1, although the best yields have been found when employing an alkaline earth salt such as barium acetate with manganese acetate in a weight ratio of about 0.3 to 0.6.

Although the oxidation of ketones to acids may be carried out at pressures above atmospheric, we prefer to use atmospheric pressure and temperature of 85° to 95° C., although the wider range of 60° to 100° C. may be employed if desired. In commencing the reaction, we prefer to use about 30% cyclohexanone in admixture with a solvent such as hereinafter described, although from 5 to 95% cyclohexanone may be employed successfully.

We have found that the yields, in the final product produced according to our invention, may be considerably increased by carrying on the oxidation in the presence of a solvent for the ketones. Various liquids substantially inert to the oxidation and capable of dissolving the ketones such as carbon tetrachloride and benzene may be used, but we prefer to use as the solvent an organic acid such as acetic, propionic, butyric, isobutyric, trimethyl acetic and such aromatic acids as phenyl acetic, such hydroxy acids or derivatives as methoxy acetic and the like. Varying proportions of these acids, based upon the total weight of the charge, may be utilized, such as 5 to 95% by weight although we prefer to utilize about 70%. Within these indicated ranges, I have found that the solvents effect a considerable increase in the yield of dibasic acid obtained by the oxidation of the ketone.

The drawing illustrates, by way of a graph, a comparison between catalysts containing cobalt and those which do not. Curves 1 and 2 show that in the absence of cobalt, yields improve rapidly from 65% to 72% as the barium is increased, but, space-time yield (which is the best measure of production capacity) drops almost linearly from a maximum of about 3.6 lbs./hr. per cubic ft. of reaction volume at zero barium to less than 3.0 lbs./hr. per cubic ft. of reaction volume at 150% C. of standard barium concentration. The barium concentration is given as percent of the barium in an optimum concentration, i. e., one in which 0.0357% barium carbonate is added to the acetic acid solution, which likewise contains 0.128% manganese acetate, 4H₂O.

Curves 3 and 4 illustrate the influence of increasing the cobalt concentration when using 0.128% manganese acetate (4 molecules of water) based on the weight of solvent used. It will be noted that the curve indicates a yield which falls off only slowly as cobalt is increased from 0 to 200–300 P. P. M. while space-time yield increases rapidly up to about 200 P. P. M. of cobalt and then drops slowly as the effect of reduced yield is noted.

Curves 5 and 6 illustrate the results obtained by varying the barium concentration in the presence of 630 parts per million P. P. M. of cobalt. While a yield maximum is obtained neither space-time yield nor process yield are as high as that obtained with catalysts containing from 150 to 200 parts per million P. P. M. of cobalt. From the data provided by the drawing it is clear that the catalyst composition described herein and covered in the attached claims is superior on the one hand, to a cobalt-free manganese acetate-barium acetate catalyst, and on the other hand, to a manganese acetate-barium acetate catalyst containing relatively large amounts of cobalt acetate.

Except with respect to the ratio of cobalt salt to the manganese and barium salt, the disclosure of this case augments the disclosure of U. S. Patent 2,316,643.

The following examples illustrate preferred embodiments of the invention.

*Example I.*—Into a stainless steel reaction vessel of 2500 cc. capacity, provided with suitably valved gas outlet and inlet lines at top and bottom, there was charged 600 grams of cyclohexanone, 1400 grams of acetic acid and 0.128% Mn(OAc)₂.4H₂O and 0.0446% BaCO₃ based on the weight of acetic acid. This mixture was heated to 80° C. and air was introduced through the inlet line at the base of the reaction vessel at a space velocity of 567 for 6.58 hours at atmospheric pressure and at a temperature of 80–85° C. Reaction was run to completion as indicated by the concentration of oxygen in the off-gas approaching 21% by volume. Reaction product was removed from the reaction vessel and adipic acid recovered by cooling the final product to crystallize the adipic acid.

Adipic acid was synthesized at the rate of 97.9 grams per hour. The yield of cyclohexanone to recovered adipic acid was 72.0%.

*Example II.*—In the table which follows are given the results of a series of runs which combine data showing actual yields and oxidation times when using cobalt as a promoter for the manganese-barium acetate catalyst. The yield variation between 84/4 and 118/21 is not significant since it is within the limits of accuracy of the experiment.

| Run | 84/4 | 118/21 | 118/23 | 118/16 |
|---|---|---|---|---|
| P. P. M. Co | 0 | 140 | 300 | 500 |
| Yield | 72.0 | 71.4 | 70.0 | 69.5 |
| Time, Hrs | 6.58 | 4.92 | 5.00 | 4.75 |

*Example III.*—The effect of cobalt on batch time was shown in large scale ketone oxidations in which 30% ketone—70% acetic acid mixtures containing manganese and barium in the same proportions as shown in Example I, were oxidized with air at 80–90° C. From this data it appears that large oxidizers are even more sensitive to cobalt than are the laboratory oxidizers.

| P. P. M. Co | 140–160 | 60–100 | 37 |
|---|---|---|---|
| Time, Hrs | 4.7–5.0 | 5.5–5.7 | 7–9 |

From the aforesaid examples it will be appreciated that when the amount of cobalt acetate is below 70 parts per million based on the manganese acetate, a considerable decrease in oxidation rates is encountered, while if the amount of cobalt acetate is increased above 200 parts per million based on the manganese acetate, a reduced rate of adipic acid production follows. In order, accordingly, to obtain optimum results there should be present the indicated preferred ratio of cobalt salts to manganese salts.

We claim:

1. A process for the catalytic oxidation of ketones which comprises subjecting to oxidation in the liquid phase, a ketone corresponding to the general formula $RCOR_1$, in which R denotes an alkyl, cycloalkyl, aralkyl or aryl radical and $R_1$, an alkyl cycloalkyl or aralkyl radical, or in which R and $R_1$, are connected with each other as members of a non-aromatic ring system, in the presence of a solvent for the ketone by means of a gas containing oxygen, in the presence of a catalyst comprising a mixture of manganese and barium organic acid salts, and from 70 to 300 parts of a cobalt organic acid salt as metal per million parts of manganese salt.

2. The process of claim 1 in which the salts are all acetate salts.

3. The process of claim 2 in which there is present from 130 to 180 parts of cobalt acetate as metal per million parts of manganese acetate.

4. A process for the catalytic oxidation of cyclohexanone which comprises subjecting cyclohexanone to oxidation in the liquid phase in the presence of a solvent for the ketone by means of a gas containing oxygen, in the presence of a catalyst comprising a mixture of manganese and barium acetates, and from 70 to 300 parts of cobalt acetate as metal per million parts of manganese acetate.

5. The process of claim 4 in which there is present from 130 to 180 parts of cobalt acetate as metal per million parts of manganese acetate.

6. A process for the catalytic oxidation of cyclohexanone which comprises subjecting cyclohexanone to oxidation in the liquid phase, at a temperature of from 60 to 100° C., in the presence of from 5 to 95%, based on the weight of the total charge, of a solvent for the ketone by means of a gas containing oxygen and in the presence of a catalyst comprising a mixture of from 0.01 to 0.2% by weight of manganese acetate and from 0.5 to 1 to 3.0 to 1 parts of barium acetate per part of manganese acetate and 130 to 160 parts of cobalt acetate as metal per million parts of manganese acetate.

7. A process for the catalytic oxidation of ketones which comprises subjecting a ketone corresponding to the general formula, $RCOR_1$, in which R denotes an alkyl, cycloalkyl, aralkyl or aryl radical and $R_1$, an alkyl, cycloalkyl or aralkyl radical, or in which R and $R_1$ are connected with each other as members of a non-aromatic ring system, to oxidation in the liquid phase, at a temperature of from 60 to 100° C., in the presence of from 5 to 95%, based on the weight of the total charge, of a solvent for the ketone, by means of a gas containing oxygen and in the presence of a catalyst comprising a mixture of from 0.01 to 0.2% by weight of manganese acetate, from 0.5 to 1 to 3.0 to 1 parts of barium acetate per part of manganese acetate, and 130 to 160 parts of cobalt acetate as metal per million parts of manganese acetate.

DONALD D. LEE.
CHARLES SPARACINO.

REFERENCES CITED

The following references are of record in the file of this patent:

UNITED STATES PATENTS

| Number | Name | Date |
|---|---|---|
| 1,960,211 | Perkins et al. | May 22, 1934 |
| 2,005,183 | Flemming et al. | June 18, 1935 |
| 2,285,914 | Drossback | June 9, 1942 |
| 2,316,543 | Amend | Apr. 13, 1943 |